(12) United States Patent
Read

(10) Patent No.: US 8,291,116 B2
(45) Date of Patent: Oct. 16, 2012

(54) COMMUNICATIONS SYSTEM

(75) Inventor: Stephen Michael Read, Summertown (GB)

(73) Assignee: Cisco Technology, Inc., San Jose, CA (US)

( * ) Notice: Subject to any disclaimer, the term of this patent is extended or adjusted under 35 U.S.C. 154(b) by 570 days.

(21) Appl. No.: 12/348,648

(22) Filed: Jan. 5, 2009

(65) Prior Publication Data

US 2009/0116487 A1    May 7, 2009

Related U.S. Application Data

(62) Division of application No. 10/432,468, filed as application No. PCT/GB01/05253 on Nov. 29, 2001, now Pat. No. 7,512,708.

(30) Foreign Application Priority Data

Nov. 30, 2000  (GB) .................................. 0029179.9

(51) Int. Cl.
*G06F 15/16* (2006.01)

(52) U.S. Cl. ....................................................... 709/245

(58) Field of Classification Search .................. None
See application file for complete search history.

(56) References Cited

U.S. PATENT DOCUMENTS

| | | | |
|---|---|---|---|
| 4,742,512 A | 5/1988 | Akashi et al. | |
| 5,282,222 A | 1/1994 | Fattouche et al. | |
| 5,301,320 A | 4/1994 | McAtee et al. | |
| 5,337,313 A | 8/1994 | Buchholz et al. | |
| 5,781,550 A | 7/1998 | Templin et al. | |
| 6,058,431 A | 5/2000 | Srisuresh et al. | |
| 6,128,298 A | 10/2000 | Wootton et al. | |
| 6,182,149 B1* | 1/2001 | Nessett et al. | 709/247 |
| 6,273,622 B1* | 8/2001 | Ben-David | 709/230 |
| 6,360,265 B1* | 3/2002 | Falck et al. | 709/227 |
| 6,401,128 B1 | 6/2002 | Stai et al. | |
| 6,438,597 B1 | 8/2002 | Mosberger et al. | |
| 6,470,020 B1* | 10/2002 | Barker et al. | 370/401 |
| 6,473,406 B1 | 10/2002 | Coile et al. | |
| 6,628,629 B1 | 9/2003 | Jorgensen | |

(Continued)

FOREIGN PATENT DOCUMENTS

EP         0 615 198        9/1994

(Continued)

OTHER PUBLICATIONS

H.323, ("Packet based multimedia communications systems"), ITU-T, Sep. 1999.*

(Continued)

*Primary Examiner* — Jeffrey Pwu
*Assistant Examiner* — William Goodchild
(74) *Attorney, Agent, or Firm* — Oblon, Spivak, McClelland, Maier & Neustadt, L.L.P.

(57) ABSTRACT

A method of performing a multimedia communication session over a communication link using Transmission Control Protocol (TCP) and over a communication link using User Datagram Protocol (UDP), including the acts of: receiving a request, over the TCP link, to register from a client terminal located within a private network; a probe data packet to the client terminal, over the TCP link, requesting to send a data packet over the UDP link; and receiving a data packet from the client terminal that contains information relating to an address of the client terminal and a dynamic port over which the multimedia communication session is to be established.

17 Claims, 3 Drawing Sheets

U.S. PATENT DOCUMENTS

| | | | |
|---|---|---|---|
| 6,631,416 | B2 | 10/2003 | Bendinelli et al. |
| 6,631,417 | B1 | 10/2003 | Balabine |
| 6,674,758 | B2 | 1/2004 | Watson |
| 7,047,561 | B1 * | 5/2006 | Lee ................................ 726/12 |
| 2002/0023143 | A1 | 2/2002 | Stephenson et al. |
| 2002/0042832 | A1 | 4/2002 | Fallentine et al. |
| 2002/0056008 | A1 | 5/2002 | Keane et al. |
| 2002/0085561 | A1 | 7/2002 | Choi et al. |
| 2002/0114319 | A1 | 8/2002 | Liu et al. |
| 2002/0114322 | A1 | 8/2002 | Xu et al. |
| 2002/0114333 | A1 | 8/2002 | Xu et al. |
| 2002/0122416 | A1 | 9/2002 | Xu et al. |
| 2002/0133534 | A1 | 9/2002 | Forslow |
| 2002/0138627 | A1 | 9/2002 | Frantzen et al. |
| 2002/0141352 | A1 | 10/2002 | Fangman et al. |
| 2002/0141384 | A1 | 10/2002 | Liu et al. |
| 2002/0141389 | A1 | 10/2002 | Fangman et al. |
| 2002/0143855 | A1 | 10/2002 | Traversat et al. |
| 2002/0152325 | A1 | 10/2002 | Elgebaly et al. |
| 2002/0199114 | A1 | 12/2002 | Schwartz |
| 2003/0009561 | A1 | 1/2003 | Sollee |
| 2003/0033418 | A1 | 2/2003 | Young et al. |
| 2003/0056002 | A1 | 3/2003 | Trethewey |
| 2003/0065944 | A1 | 4/2003 | Mao et al. |
| 2003/0084162 | A1 | 5/2003 | Johnson et al. |
| 2003/0093563 | A1 | 5/2003 | Young et al. |
| 2003/0108041 | A1 | 6/2003 | Aysan et al. |
| 2003/0110276 | A1 | 6/2003 | Riddle |
| 2003/0112809 | A1 | 6/2003 | Bharali et al. |
| 2003/0112823 | A1 | 6/2003 | Collins et al. |
| 2003/0140142 | A1 | 7/2003 | Marples et al. |
| 2003/0152034 | A1 | 8/2003 | Zhang et al. |
| 2003/0154306 | A1 | 8/2003 | Perry |
| 2003/0188001 | A1 | 10/2003 | Eisenberg et al. |
| 2003/0191848 | A1 | 10/2003 | Hesselink et al. |
| 2003/0191970 | A1 | 10/2003 | Devine et al. |
| 2003/0195861 | A1 | 10/2003 | McClure et al. |
| 2003/0212772 | A1 | 11/2003 | Harris |
| 2003/0212795 | A1 | 11/2003 | Harris et al. |
| 2003/0217039 | A1 | 11/2003 | Kurtz et al. |
| 2003/0229718 | A1 | 12/2003 | Tock et al. |
| 2003/0233471 | A1 | 12/2003 | Mitchell et al. |
| 2003/0233475 | A1 | 12/2003 | Maufer et al. |
| 2004/0006643 | A1 | 1/2004 | Dolson et al. |
| 2004/0015728 | A1 | 1/2004 | Cole et al. |
| 2004/0019808 | A1 | 1/2004 | Devine et al. |

FOREIGN PATENT DOCUMENTS

| | | |
|---|---|---|
| WO | 0130036 | 4/2001 |

OTHER PUBLICATIONS

Newport Networks, http://www.Newport-networks.com/downloads/FW-NAT-Trav-WP.pdf., 12 pages, "Solving the Firewall and NAT Traversal Issues for Multimedia Over IP Services", 2004.

J. Rosenberg, et al., Network working Groups, ftp://ftp.rfc-editor.org/in-notes/rfc 3489 txt.pp. 1-41, "Stun—Simple Traversal of User Datagram Protocol (UDP) Through Network Address Translators (NATS)", Mar. 2003.

J. Rosenberg, et al., Midcom, http://www.iptel.org/info/players/ietf/f...I. nat/draft-rosenberg-midcom-turn-01. txt, pp. 1-36, "Traversal Using Relay NAT (TURN) Draft-Rosenberg-Midcom-Turn-01", Mar. 3, 2003.

S. Suri, et al., Proceedings of the 1990 $10^{th}$ Annual ACM-SIAM Symposium on Discrete Algorithms, pp. S969-S970, "Packet Filtering in High Speed Networks", Jan. 17-19, 1999.

K. Terao, et al., Proceedings of the 1999 Internet Workshop (WS '99), Cat. No. 99EX385, pp. 32-39, "A Shared Secured Server for Multiple Closed Networks", Feb. 18-20, 1999.

N. Yoshiura, et al., Tokyo Inst. of Technel., Joho Shori Gakkai Kenkyu Hokoku, vol. 99, No. 77, pp. 1-6, "Routing Control for a Network Including Public Address and Private Address Networks", 1999, 2001(abstract only).

P. Francis, et al., SIGCOMM' 01, pp. 69-80, "IPNL: A NAT-Extended Internet Architecture", Aug. 27-31, 2001.

M. J. Freedman, et al., CCS '02, pp. 193-206, "Tarzan: A Peer-To-Peer Anonymizing Network Layer", Nov. 18-22, 2002.

H. T. Kung, et al., 2002 Military Communications Conference.Proceedings (Cat. No. 02CH37397), vol. 1, pp. 389-394, "An IP-Layer Anonymizing Infrastructure", Oct. 7-10, 2002 (abstract only).

H. Furukawa, et al., IEIC Techinical Report, Denshi Joho Tsushin Gakkai Gijuts Kenkyu Hokoku, vol. 103, No. 385, pp. 5-8, "Network Architecture for IP-VPN Proof Against DOS Attacks", 2003.

J. Son, Journal of KISS: Computing Practices, Korea inf. Sci. Soc, vol. 9, No. 1, pp. 47-59, "A NAT Proxy Server for an Internet Telephony Service", Feb. 003 (abstract only).

Sam Kotha, "Deploying H. 323 Applications in Cisco Networks", White Paper, 1998.

James Toga et al., "ITU-T Standardization activities for interactive multimedia communication on packet-based networks: H. 323 and related recommendations", pp. 205-223, Computer Networks 31, 1999.

Davies, S. et al., "Traversal of Non-Protocol Aware Firewalls & NATS", Internet Engineering Task Force, Internet Draft, Oct. 12, 2001, pp. 1-32.

Davies, S. et al., "Traversal of Non-Protoco Aware Firewalls & NATS", Inernet Engineering Task Forces, Internet Draft Mar. 18, 2001, pp. 1-30.

Egevang et al., The IP Network Address Translator (NAT); 1994.

Toga et al.: ITU-T standardization activities for interactive multimedia communications on packet-based networks: H, 323 and relates recommendation; 1999; Computer Networks 31, No. 3; pp. 205-223.

* cited by examiner

COMMUNICATIONS SYSTEM

CROSS-REFERENCE TO RELATED APPLICATIONS

The present divisional application claims the benefit of priority under 35 U.S.C. §120 to application Ser. No. 10/432,468, filed May 22, 2003, now U.S. Pat. No. 7,512,708, which is the National Stage of PCT/GB01/05253, filed Nov. 29, 2001, and under 35 U.S.C. §119 from United Kingdom Application No. 0029179.9, filed Nov. 30, 2000. U.S. application Ser. No. 10/432,468 is incorporated by reference in its entirety.

BACKGROUND OF THE INVENTION

1. Field of the Invention

The present invention relates to a communications system for handling communications sessions, for example multimedia calls or voice calls.

2. Background of the Invention

This document presents an invention that allows endpoints (using a real-time protocol, for example H.323, SIP or MGCP) located in different secure and private IP data networks to be able to communicate with each other without compromising the data privacy and data security of the individual private networks. The invention relates to a method and apparatus that has the advantage of working with existing security functions, firewalls for example, and NAPT (Network Address Port Translation) functions that may occur in firewalls, routers and proxies. The benefit of the invention is that it saves on the costs of upgrading those devices to be fully protocol (e.g. H.323) compliant or deploying additional protocol aware (e.g. H.323) devices. The invention presented in this document applies to those deployments where simple (1-to-1) NAT (Network Address translation) mapping may be applied at the edge of the private networks and/or to deployments where NAPT (Network Address and Port Translation) is applied at the edge of the private networks. The 2 configurations can coexist and the apparatus can allow communications to take place between private networks following one configuration and private networks following the other configuration. Similarly within a single private network, some terminals may use one configuration (e.g. dedicated room systems) whereas other terminals may use the second configuration (e.g. desktop client PCs). Note that for the purpose of this document NAT will refer to all types of network address translation.

The invention presented in this document is illustrated with reference to the ITU H.323 standard as that is the predominant standard for real-time multimedia communications over packet networks including IP networks. However, it is equally applicable to other standards or methods that need to dynamically assign ports to carry bi-directional information (e.g. IETF Session Initiation Protocol (SIP)). It is a major benefit of this invention that the private network infrastructure (firewalls and routers) need not be aware of the protocol used for real-time communication, and that the method of tunnelling real-time traffic in and out of a private network may also be protocol agnostic. This allows enterprises to deploy apparatus without regard to the protocol. That is not to say that some implementations may provide 'protocol' checking for security or other reasons.

The rapidly evolving IP (Internet Protocol) data network is creating new opportunities and challenges for multimedia and voice Communications Service Providers. Unprecedented levels of investment are being made in the data network backbone by incumbent telecommunication operators and next generation carriers and service providers. At the same time, broadband access technologies such as DSL and cable modems are bringing high speed Internet access to a wide community of users. The vision of service providers is to make use of the IP data network to deliver new voice, video and data services right to the desktop, the office and the home alongside high speed Internet access.

The H.323 standard applies to multimedia communications over Packet Based Networks that have no guaranteed quality of service. It has been designed to be independent of the underlying transport network and protocols. Today the IP data network is the default and ubiquitous packet network and the majority (if not all) of implementations of H.323 are over an IP data network. Other protocols for real-time (voice and video) communications, for example, SIP and MGCP also use the IP data network for the transport of call signalling and media. New protocols for new applications associated with the transport of real-time voice and video over IP data networks are also expected to be developed. The methods presented within this invention will also apply to them, and other protocols that require multiple traffic flows per single session.

The importance of standards for wide spread communications is fundamental if terminals from different manufacturers are to inter-operate. In the multimedia arena, the current standard for real-time communications over packet networks (such as IP data networks) is the ITU standard H.323. H.323 is now a relatively mature standard having support from the multimedia communications industry that includes companies such as Microsoft, Cisco and Intel. For example, it is estimated that 75% of PCs have Microsoft's NetMeeting (trade mark) program installed. NetMeeting is an H.323 compliant software application used for multimedia (voice, video and data) communication. Interoperability between equipment from different manufacturers is also now being achieved. Over 120 companies world-wide attended the last interoperability event hosted by the International Multimedia Telecommunications Consortium (IMTC), an independent organisation that exists to promote the interoperability of multimedia communications equipment. The event is a regular one that allows manufacturers to test and resolve interworking issues.

Hitherto, there had been a number of barriers to the mass uptake of multimedia (particularly video) communications. Ease of use, quality, cost and communications bandwidth had all hampered growth in the market. Technological advances in video encoding, the ubiquity of cheap IP access and the current investment in the data network coupled with the roll-out of DSL together with ISDN and Cable modem now alleviates most of these issues making multimedia communications readily available.

As H.323 was being defined as a standard, it was assumed that there would be H.323-H.320 gateways that exist at the edge of network domains converting H.323 to H.320 for transport over the wide area between private networks. Therefore, implementations of H.323 over IP concentrated on communications within a single network.

However, IP continues to find favour as the wide area protocol. More and more organisations continue to base their entire data networks on IP. High speed Internet access, managed Intranets, Virtual Private Networks (VPNs) all based on IP are commonplace. The IP trend is causing H.320 as a multimedia protocol to decline. The market demand is to replace H.320 completely with H.323 over IP. But perhaps the main market driver for transporting real-time communications over IP across the WAN (wide area network) is voice. With standards such as H.323 and SIP users had begun to use the Internet for cheap voice calls using their computers. This marked the beginning of a whole new Voice over IP (VoIP) industry that is seeing the development of new VoIP products that include Ethernet telephones, IP PBXs, SoftSwiches and IP/PSTN gateways all geared at seamlessly delivering VoIP between enterprises and users. H.323, SIP and MGCP are expected to be the dominant standards here.

Unfortunately, unforeseen technical barriers to the real-world, wide area deployment of H.323 and SIP still exist. The technical barriers relate to the communications infrastructure at the boundaries of IP data networks.

Consequently, today, successful implementation of multimedia or voice communications over IP are confined to Intranets or private managed IP networks.

The problems arise because of two IP technologies—Network Address Translation (NAT) and Firewalls. Security is also an issue when considering solutions to these problems. Where deployments of real-time communications over the data networks transverse shared networks (for example the public Internet), enterprises must be assured that no compromise to their data security is being made. Current solutions to these problems require the outside or external IP address(es) of enterprise to become public to anyone with whom that enterprises wishes to communicate (voice communications usually includes everyone). The invention presented herein does not suffer this shortfall as enterprises external IP address(es) need only be known to the 'trusted' service provider which is how the public Internet has largely evolved.

NAT has been introduced to solve the 'shortage of addresses' problem. Any endpoint or 'host' in an IP network has an 'IP address' to identify that endpoint so that data packets can be correctly sent or routed to it and packets received from it can be identified from where they originate. At the time of defining the IP address field no-one predicted the massive growth in desktop equipment. After a number of years of global IP deployment, it was realised that the number of endpoints wanting to communicate using the IP protocol would exceed the number of unique IP addresses possible from the address field. To increase the address field and make more addresses available requires the entire IP infrastructure to be upgraded. (The industry is planning to do this with IP Version 6 at some point).

The solution of the day is now referred to as NAT. The first NAT solution, which is referred to as simple NAT in IETF RFC 1631, uses a one-to-one mapping, came about before the World-Wide Web existed and when only a few hosts (e.g. email server, file transfer server) within an organisation needed to communicate externally to that organisation. NAT allows an enterprise to create a private IP network where each endpoint within that enterprise has an address that is unique only within the enterprise but is not globally unique. These are private IP addresses. This allows each host within an organisation to communicate (i.e. address) any other host within the organisation. For external communication, a public or globally unique IP address is needed. At the edge of the private IP network is a device that is responsible for translating a private IP address to/from a public IP address—the NAT function. The enterprise will have one or more public addresses belonging exclusively to the enterprise but in general fewer public addresses than hosts are needed either because only a few hosts need to communicate externally or because the number of simultaneous external communications is smaller. A more sophisticated embodiment of NAT has a pool of public IP addresses that are assigned dynamically on a first come first served basis for hosts needing to communicate externally. Fixed network address rules are required in the case where external equipment needs to send unsolicited packets to specific internal equipment.

Today, most private networks use private IP addresses from the 10.x.x.x address range. External communications are usually via a service provider that offers a service via a managed or shared IP network or via the public Internet. At the boundaries between the public and private networks NAT is applied to change addresses to be unique within the IP network the packets are traversing. Simple NAT changes the complete IP address on a one-to-one mapping that may be permanent or dynamically created for the life of the communication session.

Web Servers, Mail Servers and External servers are examples of hosts that would need a static one-to-one NAT mapping to allow external communications to reach them.

A consequence of NAT is that the private IP address of a host is not visible externally. This adds a level of security.

An extension to simple NAT additionally uses ports for the translation mapping and is often referred to as NAPT (Network Address Port Translation) or PAT (Port Address Translation). A port identifies one end of a point-to-point transport connection between 2 hosts. With mass access to the World-Wide-Web (WWW), the shortage of public IP addresses was again reached because now many desktop machines needed to communicate outside of the private network. The solution as specified in IETF RFC 1631, allows a many-to-one mapping of private IP addresses to public IP address(es) and instead used a unique port assignment (theoretically there are 64 k unique ports on each IP address) on the public IP address for each connection made from a private device out into the public or shared network. Because of growth of the Internet, PAT is the common method of address translation.

A peculiarity of PAT is that the private IP address/port mapping to public IP address/port assignments are made dynamically, typically each time a private device makes an outbound connection to the public network. The consequence of PAT is that data cannot travel inbound, that is from the public network to the private network, unless a previous outbound connection has caused such a PAT assignment to exist. Typically, PAT devices do not make the PAT assignments permanent. After a specified 'silence' period has expired, that is when no more inbound data has been received for that outbound initiated connection, the PAT assignment for that connection is unassigned and the port is free to be assigned to a new connection.

While computers and networks connected via a common IP protocol made communications easier, the common protocol also made breaches in privacy and security much easier too. With relatively little computing skill it became possible to access private or confidential data and files and also to corrupt that business information maliciously. The industry's solution to such attacks is to deploy 'firewalls' at the boundaries of private networks.

Firewalls are designed to restrict or 'filter' the type of IP traffic that may pass between the private and public IP networks. Firewalls can apply restrictions through rules at several levels. Restrictions may be applied at the IP address, the Port, the IP transport protocol (TCP or UDP for example) or the application. Restrictions are not symmetrical. Typically a firewall will be programmed to allow more communications from the private network (inside the firewall) to the public network (outside the firewall) than in the other direction.

It is difficult to apply firewall rules just to IP addresses. Any inside host (i.e. your PC) may want to connect to any outside host (a web server) dotted around the globe. To allow further control the concept of a 'well known port' is applied to the problem. A port identifies one end of a point-to-point transport connection between 2 hosts. A 'well known port' is a port that carries one 'known' type of traffic. IANA, the Internet Assigned Number Authority specifies the well known ports and the type of traffic carried over them. For example port 80 has been assigned for web surfing (http protocol) traffic, port 25 Simple Mail Transport Protocol etc.

An example of a firewall filtering rule for Web Surfing would be:

Any inside IP address/any port number may connect to any outside IP address/Port 80 using TCP (Transport Connection protocol) and HTTP (the application protocol for Web Surfing).

The connection is bi-directional so traffic may flow back from the Web Server on the same path. The point is that the connection has to be initiated from the inside.

An example of a firewall filtering rule for email may be:

Any outside IP address/any port number may connect to IP address 192.3.4.5/port 25 using TCP and SMTP.

(Coincidentally, the NAT function may change the destination IP address 192.3.4.5 to 10.6.7.8 which is the inside address of the mail server.)

Filtering rules such as "any inside IP address/any port number may connect to any outside IP address/any port number for TCP or UDP and vice versa" are tantamount to removing the firewall and using a direct connection as it is too broad a filter. Such rules are frowned upon by IT managers.

H.323 has been designed to be independent of the underlying network and transport protocols. Nevertheless, implementation of H.323 in an IP network is possible with the following mapping of the main concepts:

1H.323 address: IP address

H.323 logical channel: TCP/UDP Port connection

In the implementation of H.323 over IP, H.323 protocol messages are sent as the payload in IP packets using either TCP or UDP transport protocols. Many of the H.323 messages contain the H.323 address of the originating endpoint or the destination endpoint or both endpoints. Other signalling protocols such as SIP also embeds IP addresses within the signalling protocol payload.

However, a problem arises in that NAT functions will change the apparent IP addresses (and ports) of the source and destination hosts without changing the H.323 addresses in the H.323 payload. As the hosts use the H.323 addresses and ports exchanged in the H.323 payload to associate the various received data packets with the call, this causes the H.323 protocol to break and requires intermediary intelligence to manipulate H.323 payload addresses.

Because of the complexity of multimedia communications, H.323 requires several logical channels to be opened between the endpoint. Logical channels are needed for call control, capabilities exchange, audio, video and data. In a simple point-to-point H.323 multimedia session involving just audio and video, at least 6 logical channels are needed. In the IP implementation of H.323, logical channels are mapped to TCP or UDP port connections, many of which are assigned dynamically.

As the firewall functions filter out traffic on ports that they have no rules for, either the firewall is opened, which defeats the purpose of the firewall, or much of the H.323 traffic will not pass through.

Therefore, both NAT and firewall functions between endpoints prevent H.323 (and other real-time protocols, SIP and MGCP for example) communications working. This will typically be the case when the endpoints are in different private networks, when one endpoint is in a private network and the other endpoint is in the Internet or when the endpoints are in different managed IP networks.

H.323 (and SIP, MGCP etc.) communication is therefore an anathema to firewalls. Either a firewall must become H.323 aware or some intermediary intelligence must manipulate the port assignments in a secure manner.

One possible solution to this problem would be a complete IP H.323 infrastructure upgrade. This requires:

H.323 upgrade to the NAT function at each IP network boundary. The NAT function must scan all H.323 payloads and consistently change IP addresses.

H.323 upgrade to the firewall function at each IP network boundary. The firewall must understand and watch all H.323 communication so that it can open up the ports that are dynamically assigned and must filter all non-H.323 traffic on those ports.

Deployment of H.323 intelligence at the boundary or in the shared IP network to resolve and arbitrate addresses. IP addresses are rarely used directly by users. In practice, IP address aliases are used. Intelligence is needed to resolve aliases to an IP address. This H.323 function is contained within H.323 entities called Gatekeepers.

The disadvantages of this possible solution are:

Each organisation/private network must have the same level of upgrade for H.323 communication to exist.

The upgrade is costly. New functionality or new equipment must be purchased, planned and deployed. IT managers must learn about H.323.

The scale of such a deployment will likely not be readily adaptable to the demands placed on it as the technology is progressively adopted, requiring a larger and more costly initial deployment than initial (perhaps experimental) demand requires.

The continual parsing of H.323 packets to resolve the simple NAT and firewall function places a latency burden on the signal at each network boundary. The latency tolerance for audio and video is very small.

Because there are a multitude of standards for real-time communication and each of the signalling protocols of those standards are different, an enterprise would need multiple upgrades—one for each protocol it wishes to use.

The media is expected to travel directly between enterprises or between an enterprise and a device in the public network. The consequence of this is that the IP addresses of an enterprise become public knowledge. This is regarded as a security compromise as any potential attacker must first discover the enterprises IP address as the first step to launching an attack.

As a result of these problems, the H.323 protocol is not being used for multimedia communications when there is a firewall and/or network address translation (NAT). One approach has been to place H.323 systems on the public side of the firewall and NAT functions. This allows them to use H.323 while also allowing them to protect the remainder of their network. The disadvantages of this are:

1. The most ubiquitous device for video communications is the desktop PC. It is nonsensical to place all desktop computers on the public side!

2. The H.323 systems are not protected from attackers on the public side of the firewall.

3. The companies are not able to take advantage of the potentially ubiquitous nature of H.323, since only the special systems will be allowed to conduct H.323 communications.

4. The companies will not be able to take full advantage of the data-sharing facilities in H.323 because the firewall will prevent the H.323 systems from accessing the data. Opening the firewall to allow data-transfer functions from the H.323 system is not an option because it would allow an attacker to use the H.323 system as a relay.

5. In the emerging Voice over IP (VoIP) market there is a market for telephony devices that connect directly to the data network, for example Ethernet telephones and IP PBXes. By virtue of the desktop nature they are typically deployed on the private network behind firewalls and NAT. Without solutions to the problems described above telephony using these devices is confined to the Enterprises private network or Intranet or must pass through IP-PSTN gateways to reach the outside world.

The advantages of using the broadband connection to the enterprise for voice and video as well as data require secure solutions to these issues.

SUMMARY OF THE INVENTION

It is an object of the present invention to address these problems.

Accordingly, the invention provides a communications system for handling a communications session with a destination communication system, comprising a first local terminal, an external server, one or more logical channels between the first local terminal and the external server for carrying the communications session over a shared communications network, said communication means including a first NAT function through which the communications session must pass, in which:

a) the first local terminal has at least one transport address for the communications session;

b) the first NAT function applies network address mappings on the transport addresses on connections between the first terminal and the shared communications network;

c) the system includes a first proxy interface agent arranged to act on behalf of the first local terminal in communications with the external server;

d) the first proxy interface agent is capable of establishing a logical channel on one or more outbound connections to the external server, said logical channel serving as a control channel between the first proxy interface agent and the external server;

wherein:

e) said outbound connection(s) are dynamic outbound connections established by the first proxy interface agent;

f) the first proxy interface agent is adapted to make association(s) between the transport address(es) of the first local terminal and identifiable logical channel(s) between the first proxy interface agent and the external server, said identifiable logical channel(s) being established on one or more of said dynamic outbound connections from the first proxy interface agent to the external server.

Also according to the invention, there is provided a method of handling a communications session in a communications system, the communications system comprising a first local terminal, an external server, a first proxy interface agent between the first local terminal and the shared network, said communication means including a first NAT function through which the communications session must pass, in which the method comprises the steps of:

i) carrying the communications session over a shared communications network over one or more logical channels between the first local terminal and the external server, the first local terminal having at least one transport address for the communications session;

ii) allowing the first NAT function to continue to apply network address mappings on the transport addresses on connections between the first terminal and the shared communications network;

iii) using the first proxy interface agent to act on behalf of the first local terminal in communications with the external server;

iv) using the first proxy interface agent to establish a logical channel on one or more outbound connections to the external server, said logical channel serving as a control channel between the first proxy interface agent and the external server;

wherein the method comprises the steps of:

v) using the first proxy interface agent to establish dynamic outbound connection(s) to the external server;

vi) using the first proxy interface agent to make one or more associations between the transport address(es) of the first local terminal and identifiable logical channel(s) between the first proxy interface agent and the external server, said identifiable logical channel(s) being established on one or more of said dynamic outbound connections from the first proxy interface agent to the external server.

The sum of the logical channels provides the communications session and the outbound connections create the necessary NAT mappings that enable inbound and outbound communications between the terminal and the external server. Communication to and from the first local terminal is transparently mapped by the first proxy interface agent onto the identifiable logical channels. The external server communicates with the destination communication system as if it were the first terminal. The communications system therefore can be used to provide a transparent communications means between the first terminal and the destination communication system, the external server being responsible for onward forwarding of the communications.

In order to allow inbound communications over TCP, previously established bi-directional outbound connections are made to establish NAT mappings.

In order to allow inbound communications over UDP, probe packet(s) are sent to establish the NAT mappings.

During the communications session, the first NAT function continues to apply network address mappings to connections between the first proxy interface agent and the external server.

Identifiable logical channels may be multiplexed into one or more connections using normal multiplexing techniques.

An example of a transport address is an IP address plus a port number. The network address mappings will in general therefore be mappings of IP addresses and/or ports.

In one embodiment of the invention, the first proxy interface agent makes said associations in response to a request from the external server.

In another embodiment of the invention, the first proxy interface agent makes said associations in response to a request generated by the first proxy interface agent itself.

The external server itself (or alternatively the first proxy interface agent) may also be adapted to request the external server to make associations between the said identifiable logical(s) channels and the logical channels of communication between the external server and the destination communication system such as a destination terminal.

The transport address(es) of the first local terminal are preferably assigned dynamically. Similarly, the transport address(es) of the external server may be assigned dynamically.

Alternatively, none of the transport address(es) of the external server may be assigned dynamically.

The communications system may include a first firewall through which the communications session must pass. The first firewall is then configured to restrict certain types of communication between the first local terminal and the shared communications network and being configured not to restrict communication between the first proxy interface agent and the external server.

At least one of the transport address(es) of the external server may have at least one pre-assigned (sometime referred to as 'well-known') port. The outbound connections from the first proxy interface agent to the external server then uses said pre-assigned port(s).

Preferably, all the transport address(es) of the external server, to which the said outbound connections from the first proxy interface agent to the external server connect, have pre-assigned ports. In this case, it may be that all the transport address(es) of the external server have at most two pre-assigned ports.

The number of pre-assigned ports of the external server may be less than or equal to the total number of dynamically assigned ports for the terminal(s). For example, the external server may have three pre-assigned ports, one for TCP and two for UDP.

The communications system may include a second local terminal and the external server is a proxy server between the first terminal and the second terminal that acts for each terminal as a proxy for the other terminal during the course of the communications session.

In many cases, there may be a second local terminal with a second firewall and/or second NAT function through which the communication session must pass. The second firewall may then be configured to restrict certain types of communication between the second terminal and the public communications network. The external server will then have logical communication ports for communication with the terminals including, for example, one or more pre-assigned ports for communication with the second terminal. The second firewall can then be configured not to restrict communication between the second terminal and the pre-assigned port(s) of the proxy server, and a second proxy interface agent is deployed to act on behalf of the second terminal in its communication with the external server. The second local terminal may then engage in a communications session with a second proxy interface agent in a similar manner to that described above.

Additionally, a second terminal and second proxy interface agent may connect to a second external server. External server(s) communicate via the public or shared network.

The shared communications network will in general include the public communications network and/or the Internet.

The proxy interface agent may be co-located with the local terminal, or alternatively, the proxy interface agent may be remote from the local terminal.

The invention may also be useful in cases where there is more than one local terminal per proxy interface agent. The proxy interface agent can then act simultaneously on behalf of terminals using the same or different real-time (or non-real-time) protocols, for example both H.323 and SIP. The signalling gateway functionality (for example between H.323 and SIP) is preferably provided within either the external server or the proxy interface agent.

Additional features and functionality (for example QOS and/or security via encryption) may be provided by the proxy interface agent and external server transparently to the endpoints.

Such a system may be used for making a voice or a multimedia call according to the H.323 standard of the International Telecommunications Union. Alternatively, the system may be used for making a voice or a multimedia call according to the SIP standard of the Internet Engineering Task Force. Such a system and method may also be used for setting up other types communication sessions through firewalls and NATs using non-real-time protocols, for example file transfer, that in order to function involve the dynamic creation of logical channels identified by transport addresses that are left unmodified by said NATs. Furthermore, the communications system may support mixed protocol environments.

The proxy interface agent may be co-located with an endpoint (for example a PC terminal) or may reside in a separate device from the endpoint(s) it is acting on behalf of.

The terminals may be adapted to transmit and/or receive multimedia media signals together with associated multimedia control signals, the control signals being sent to one of the pre-assigned ports and the media signals being sent to the other pre-assigned ports.

Preferably, at least one the logical communications ports is a pre-assigned port, said request being sent to the pre-assigned port as an initial request to initiate a communication session.

The communication means may be adapted for making a voice or a multimedia call at least in part via the internet, in which case the external server will have a public internet protocol address by which one or both of the terminals communicate with the external server, the firewall(s) being configured not to restrict communication between the terminal(s) and the pre-assigned port(s) of the external server.

The invention is applicable to the case where there is one or more pair(s) of first terminals and of second terminals. For example, several first voice or multimedia terminals at one site may each connect to corresponding other second voice or multimedia terminals at a variety of other sites.

The invention allows two terminals located in separate private networks to communicate via a common public (or shared) network in which one or both private networks are connected to the public network via firewalls and/or NATs that restrict certain types of communication. Equally, the invention allows one terminal in a private network to communicate with a terminal in a public network, wherein the two networks are connected by firewalls and/or NATs that restrict certain types of communication.

The invention will be described by reference only to the operation between a first endpoint, herein referred to as the first local terminal and an intermediary server, herein referred to as the external server. The operation between a second terminal and the external server mirrors the operation between the first terminal and the external server. Additionally, where the second terminal is directly connected to the public network, this is equivalent to it being connected to a private network in which the firewall and NAT implement null functions. That is, the firewall does not restrict any connections and the NAT uses the same address on both sides for a given connection.

The invention involves the deployment of an external server in the shared or public network and a proxy interface agent in the private network. The external server may be owned and operated by a public service provider, and thus will typically already be provisioned prior to an enterprise wishing to deploy H.323 communications across the private/public network boundary. The proxy interface agent may be implemented as part of the terminal, or it may be independent of the terminal implementation, but operate on the same device as the terminal, or it may be installed on a separate device.

When enabled, the proxy interface agent will establish a TCP connection to the external server. This connection will be via the firewall and/or NAT if either or both are present. This requires the firewall to allow outgoing TCP connections to the external server's address & well-known port(s). The NAT is able to provide a private to public address mapping (and vice versa) because the connection is created in the outbound direction. As part of the setup process, the external server may authenticate itself with the proxy interface agent, and the connection may be encrypted. The protocol that operates over this connection allows the multiplexing of multiple signalling protocols. Such signalling protocols include, but are not limited to, H.225 RAS, H.225 call signalling, H.245 and SIP. Indeed, this connection is sufficient for all communications between the first local terminal and external server for which the performance characteristics of a TCP connection are acceptable. Once established, the multiplexed connection will remain largely dormant except for periodic registration messages until an outgoing or incoming call attempt is made. For additional security, this connection may be continually setup and disconnected at regular (short) intervals. Each setup of the connection can potentially create a different port assignment in the NAT function, and new encryption keys. Attackers' chances of exploiting this connection are consequently reduced.

The transport characteristics of the multiplex connection are, however, not appropriate for real-time media such as audio and video. These require UDP based RTP/RTCP connections to be established between the proxy interface agent and the external server. Both in-bound and out-bound RTP/RTCP connections require UDP traffic in both directions. To send media from the terminal to the public network via the external server, the external server sends H.323 messages to the terminal (via the proxy interface agent using the multiplexed connection) that instruct the terminal to send its media to the proxy interface agent. (This can be done using standard H.323 procedures by populating the various data fields of the H.323 messages with address and port values that give the illusion that the terminal and proxy interface agent are the two ends of the H.323 call.) The proxy interface agent must then establish UDP data exchange both to and from the external server through the firewall and/or NAT.

In principle the proxy interface agent can establish a UDP connection to the external server by simply sending a UDP packet to the address and well-known port(s) of the external server. The firewall can be configured to let this traffic through, and the NAT can create a private-to-public address mapping because the connection is created in the outbound direction. However, a device that handles multiple calls involving many UDP connections (such as the external server) typically uses the IP destination address and port, and/or IP source address and port to associate the UDP information with the appropriate call. In the case of the external server, all the UDP data must be sent to the same IP address and one of the well-known ports in order to be allowed through the firewall. Therefore the IP destination address and port may not be used to differentiate the various UDP connections. Also, from the perspective of the external server, the NAT will assign an effectively random source IP address and port to the UDP packets that it sends. The result is that the IP source address and ports of the UDP data that arrives at the external server will not correspond to any of the media channels that the external server (or alternatively the proxy interface agent) has negotiated through the various signalling channels.

To solve the association problem, the external server (or alternatively the proxy interface agent) instructs the proxy interface agent (via the TCP based multiplexed connection) to send it a probe packet using the same IP source and destination addresses and ports that the proxy interface agent will send subsequent UDP data for this connection. The probe packet contains a unique token chosen by the external server (or alternatively the proxy interface agent) that allows the external server to associate the received probe packet with the appropriate UDP connection. In turn, the external server can associate the IP source and destination addresses and ports of the probe packet with the UDP connection. Knowing this address and port information the external server can associate UDP data subsequently received with these IP addresses and ports with the appropriate call enabling it to forward correctly to/from the destination communication system. In an alternative embodiment of the invention, the token information can be multiplexed in with each UDP packet that is sent. Additionally, multiple logic channels can be multiplex onto the same UDP connection. The advantage of taking the latter approach is to conserve port usage in the proxy interface agent. A second advantage is to reduce bandwidth taken by the UDP header information that is normally sent on every RTP/RTCP packet. When a smaller number of TCP and UDP connections are used because of the multiplexing of logical channels, those connections may be place onto pre-assigned or well-known ports at the proxy interface agent. This allows a further tightening of the firewall rules.

To send data from the external server to the proxy interface agent, it is necessary for a public-to-private address mapping to be made in the NAT. As this is typically a 1-to-many mapping, NATs are typically unable to dynamically make such a mapping. However, it is observed that the network path established when making an outgoing UDP connection from proxy interface agent to external server as described above is in actual fact bi-directional in nature. Hence, to establish a UDP connection from the external server to the proxy interface agent, the same steps as for establishing a UDP connection from the proxy interface agent to the external server are followed. However, once the association of addresses and ports is established, the external server uses this information to send UDP data rather than receive UDP data. The proxy interface agent will then send the UDP data on to the terminal. Standard H.323 signalling using appropriate address and port values can be used to prepare the terminal to receive the UDP data from the proxy interface agent.

As has been described, the first proxy interface agent and the external server provide a communication system and method to enable the first terminal to communicate with a destination communication system through unmodified NATs and Firewalls. This is accomplished by:

a) modifying the addresses in the protocol (H.323, SIP etc.) such that the terminal communicates with the first proxy interface agent as if it were the destination communication systems and the destination communication system communicates with the external server as if were the first terminal; and by b) dynamically making association between 1) the logical channels used by the first terminal with 2) identifiable logical channels from the first proxy interface agent to the external server, said identifiable logical channels being created on dynamic outbound connection(s) from the first proxy interface agent to the external server with 3) the logical channels between the external server and the destination communication system.

Modifications to the addresses within the protocol may be made by the external server, the first proxy interface agent or both. Wherever said modifications are made, requests and instructions need to be communicated between the first proxy interface agent and external server so that said dynamic associations can be made. Requests and instructions are carried in a client-server protocol between the first proxy interface agent (client) and external server (server), said client-server protocol being carried over the control channel that is also carried on an outbound connection from the first proxy interface agent to the external server.

When the external server is responsible for making the address modifications in the protocol, the external server is said to be master of the client-server protocol and the first proxy interface agent is the slave.

When the first proxy interface is responsible for making the address modifications in the protocol, the first proxy interface is said to be master of the client-server protocol and the external server agent is the slave.

When both first proxy interface agent and external make protocol modifications, they may negotiate or be configured to make one the master, the other, the slave.

Because one or more outbound connections from the first proxy interface agent for one or more calls may arrive at the same transport address at the external server, and said outbound connections may have passed through one or more NATs that cause the source address of the outbound connections to be randomised, probe packets containing known identifiers, said identifiers being exchanged between first proxy interface agent and external server (or vice versa), are used to establish said outbound connections. Said identifiers enable the external server to complete the association it needs to correctly forward the call to/from the destination communication system.

BRIEF DESCRIPTION OF THE DRAWINGS

The invention will be described by way of example, with reference to the accompanying drawings, in which.

DETAILED DESCRIPTION

Figure 1:
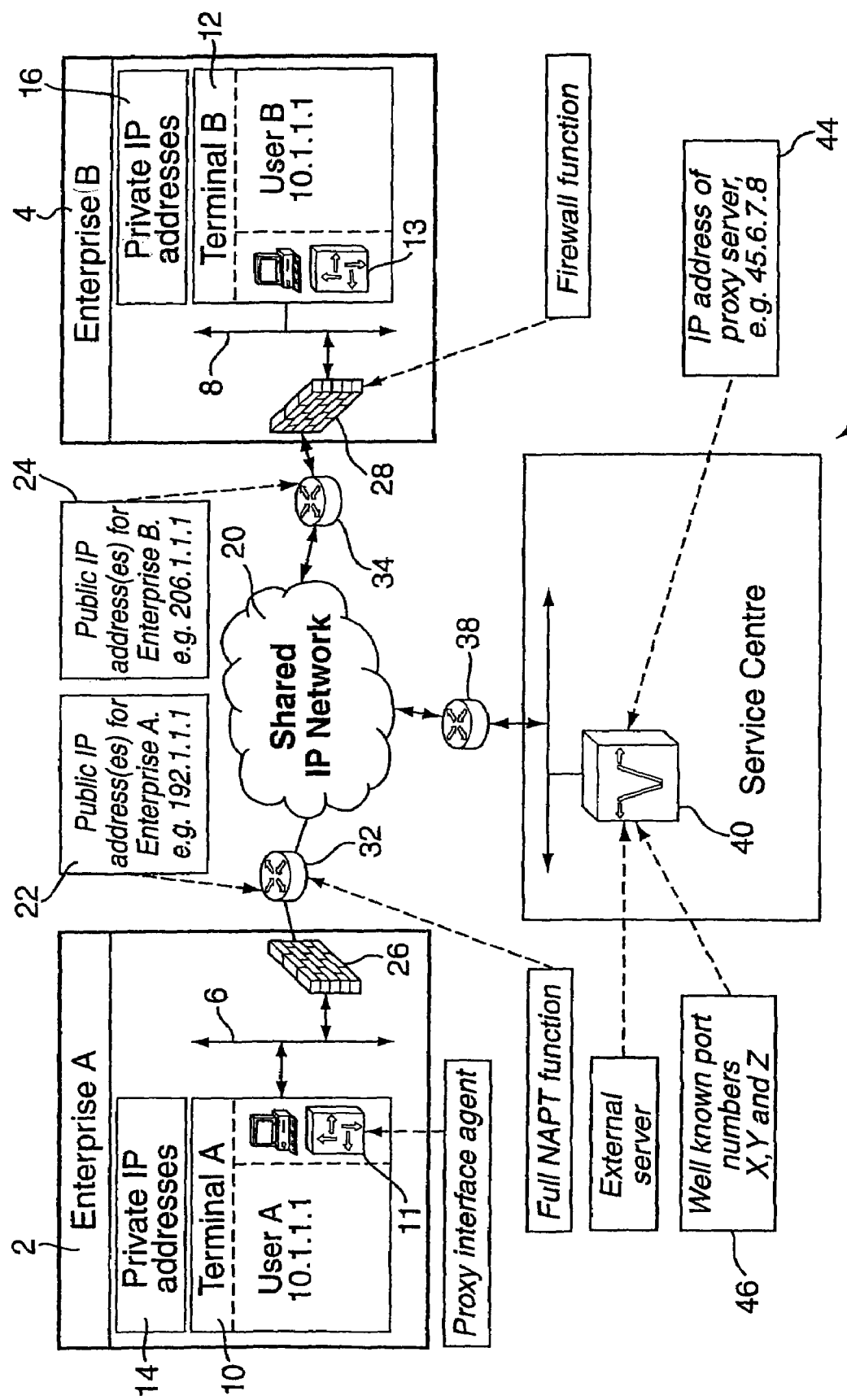
FIG. 1 is a schematic diagram of a communications system according to the invention for making a voice or a multimedia call between two enterprises in which the proxy interface agent is co-located with an endpoint.
Figure 2:
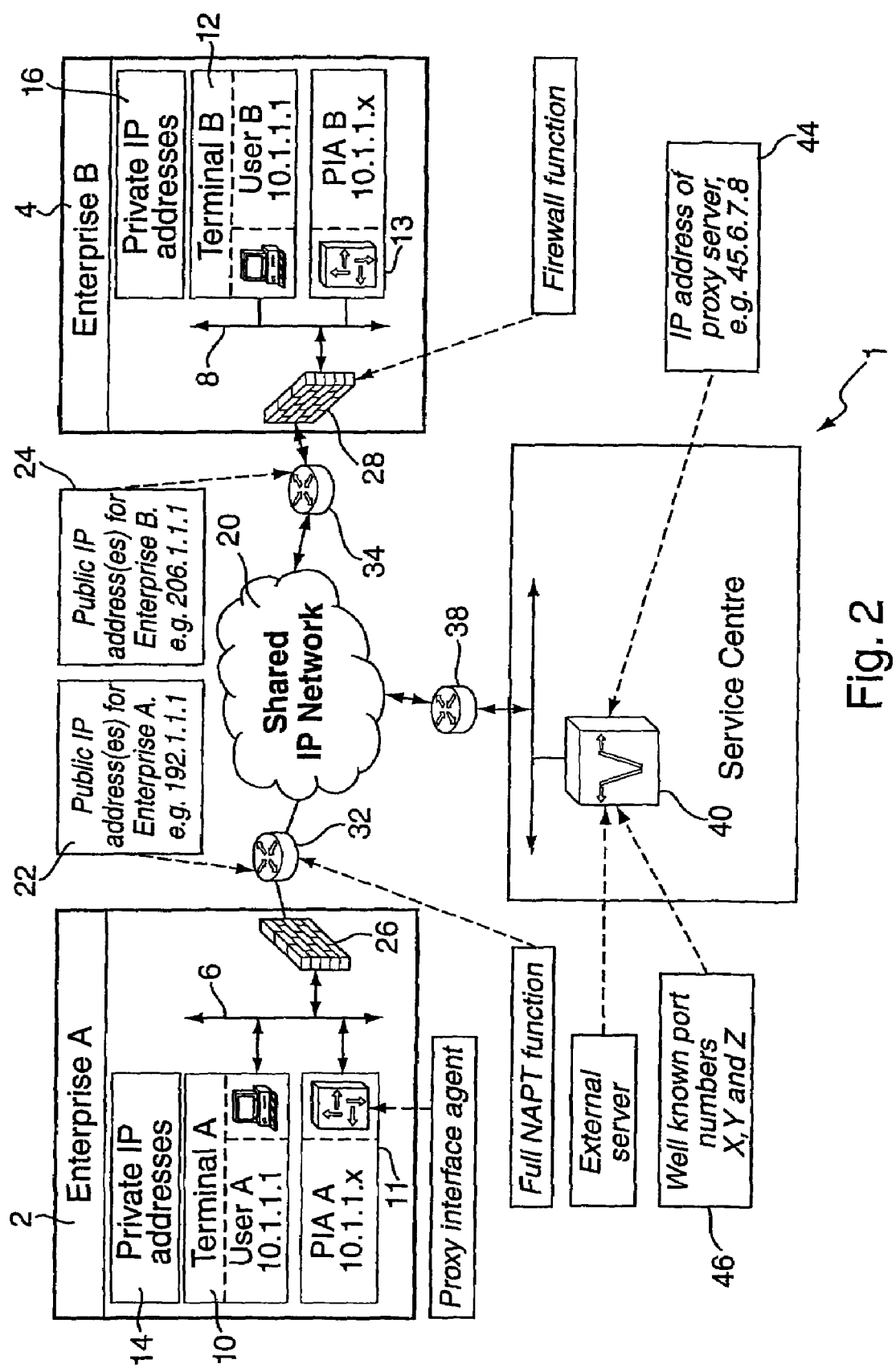
FIG. 2 is a schematic diagram similar to that of FIG. 1, except that the proxy interface agent is remote from the endpoint.

The alternative to a complete H.323 upgrade is presented in the example described with reference to FIG. 1. This shows a communication system 1 having a first enterprise 2 and a second enterprise 4, each of which include private networks 6,8 both of which have one or more H.323 terminals 10,12. Each private network 6,8 has private IP addresses 14,16 coincidentally within the 10.x.x.x address range. The private IP addresses 14,16 may result from a static assignment or dynamic assignment through normal DHCP procedures. Included in the private networks 6,8 are proxy interface agents 11,13 that act on behalf of terminals 10,12 respectively. If the proxy interface agents are not co-located with their respective terminal(s), then the proxy interface agent(s) will have a unique IP address within the range of their respective private networks 14,16. In such cases, each proxy interface agent 11,13 may act on behalf of multiple terminals 10,12. In FIG. 1, the proxy interface agents are shown as co-located, and in FIG. 2 they are shown not co-located. External communication is via a shared, managed or public Internet 20. For external communication, the first enterprise 2 has one or more public IP address(es) 22, for example in a range beginning at 192.1.1.1 and the second enterprise 4 has one or more public IP address(es) 24, for example in a range beginning at 206.1.1.1. Each enterprise has a router 32,34 that applies Network Address Port Translation (NAPT) to dynamically map between inside IP addresses 14,16 and port numbers on those addresses(private) and one of the outside IP addresses 22,24 and the port numbers on the select IP address (public).

The private networks 6,8 are optionally each protected at their edges with firewall functions 26,28. The firewall functions are configured with the rules shown in Table 1 to allow real-time communications such as those based on H.323. The rules take into account the two or more new well known ports proposed under an earlier invention, referred to as X, Y and Z. Port Z may in practice be equal to either X or Y.

TABLE 1

| Rule | From IP Address | From Port | To IP Address | To Port | IP protocol | Application |
| --- | --- | --- | --- | --- | --- | --- |
| 1 | Any | Any | External server | Z | TCP | Outbound Multiplex Connection |
| 2 | External server | Z | Any | Any | TCP | Inbound Multiplex Connection |
| 3 | Any | Any | External server | X | UDP | Outbound Media (RTP) |
| 4 | External server | X | Any | Any | UDP | Inbound Media (RTP) |
| 5 | Any | Any | External server | Y | UDP | Outbound Media (RTCP) |
| 6 | External server | Y | ANY | Any | UDP | Inbound Media (RTCP) |

In Table 1, ideally the listed port numbers, X, Y and Z are registered port numbers according to standards agreed to by IANA. The advantage of these ports being industry standard ports is that intermediary equipment such as firewalls and routers would know the associated media is real-time traffic and could, therefore, handle it appropriately, for example a router could give it higher priority forwarding in order to minimise delays.

In order for H.323 terminals 10 in the first enterprise 2 to communicate with other H.323 terminals 12 in the second enterprise 4, there must exist a shared network 20 to which a external server 40 is connected, for example, via a router 38. The external server 40 has a public IP address 44, for example 45.6.7.8. The external server would also have new well known ports numbers X, Y and Z 46 that would have to be agreed and registered in advance with IANA.

Figure 3:
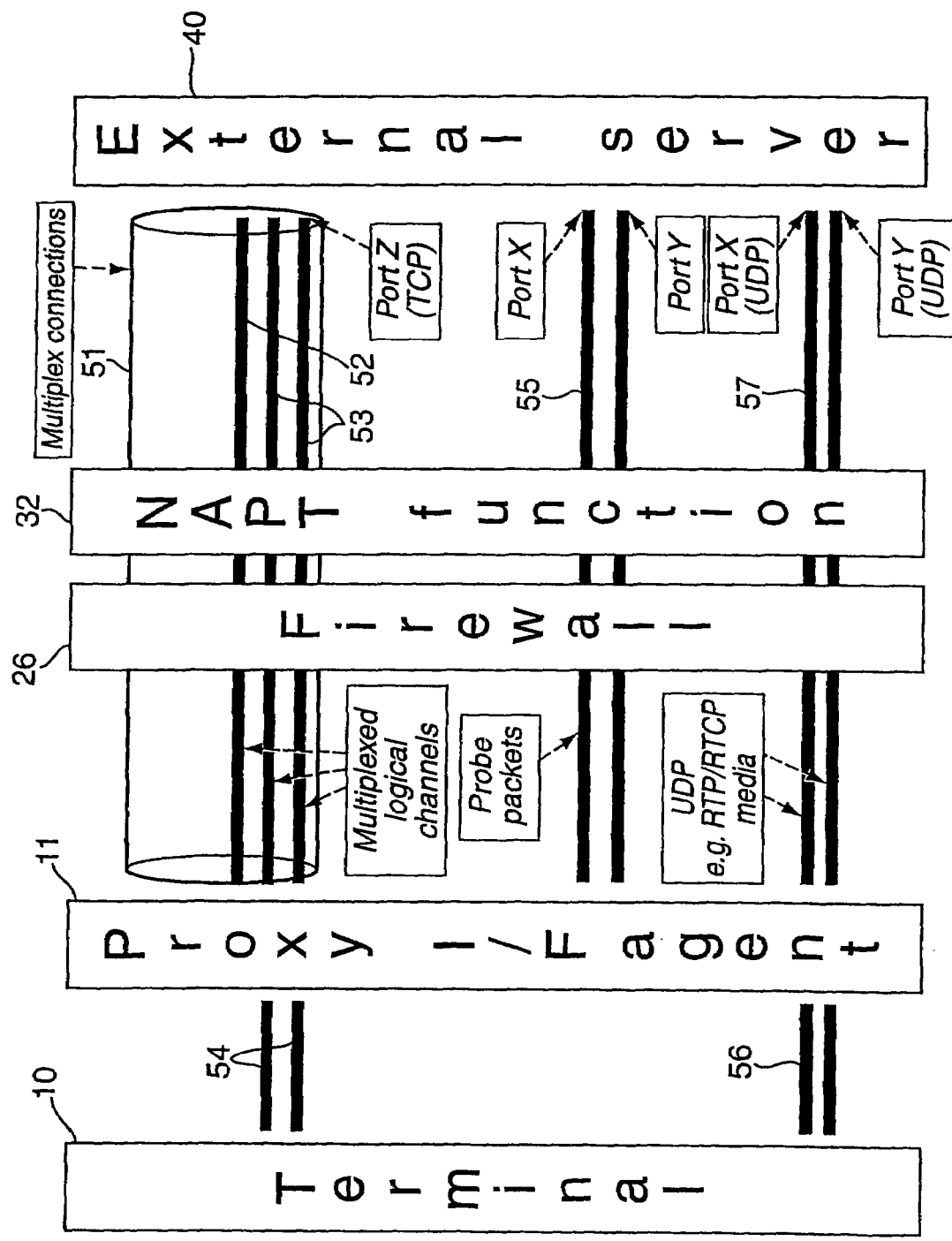
FIG. 3 is a schematic diagram of the communications systems of FIGS. 1 and 2, showing the logical channels on outbound connections for both outbound and inbound communications, at one enterprise between the local terminal and the external server.

FIG. 3 shows the communications paths between the various entities from the perspective of the first terminal 10, the first proxy interface 11, the first firewall 26, the first NAPT router 32 and the external server 40. The figure shows the multiplex connection 51 between the proxy interface agent 11 and the external server 40, via the firewall 26 and NAPT router 32. Within the multiplex connection 51 are one or more logical channels 52, 53. One of these is the control channel 52, while the others 53 carry signalling protocols such as H.225 RAS, H.225 call signalling, H.245, SIP and MGCP. As part of the operation described below, the proxy interface agent 11 will send probe packets 55 to the external server 40, and establish UDP connections 56, 57 between the terminal 10 and the external server 40. One or more logical channels may be multiplexed into the UDP connections 56, 57 to carry media such as RTP and RTCP for example.

The proxy interface agent 11 may operate in one of a number of modes depending on operational requirements. Principally it can be either protocol agnostic or protocol aware. If it is protocol agnostic the external server 40 will command the proxy interface agent 11 to open and close any UDP sockets needed. This is the most flexible mode as it allows terminals employing new protocols to be added to the private network without upgrading the proxy interface agents 11. However, without due care, this could present a security threat as third parties could instruct the proxy interface agent to open UDP channels for illicit purposes. For this reason, if this mode is adopted, it is recommended that as a minimum the proxy interface agent 11 perform some form of auditing. If the proxy interface agent 11 is protocol aware, then it can allocate ports when instructed by the external server 40, but not implement the relaying function until it has observed appropriate protocol signalling to indicate that these ports are being used for an approved application. Further more, when the proxy interface agent is protocol aware, there is no need for the external server to be protocol aware because the proxy interface agent now has all the intelligence with which to request the external server to make the necessary associations so it can provide the correct forwarding between the logical channels that are established on outbound connections from the proxy interface agent to the external server and the destination communication system (i.e. the call). This mode is more secure, but less flexible with regard to deploying new applications, or application upgrades. For simplicity, the example described below assumes the proxy interface agent 11 is operating in the protocol agnostic mode.

When the proxy interface agent 11 is enabled it establishes a multiplex connection 51 as a communications channels to the external server 40 by initiating an outbound TCP connection to the address and port of the external server 44, 46. (This connection will typically be authenticated and encrypted, but such matters are beyond the scope of this document.)

The multiplex connection 51 is capable of transporting the information pertaining to multiple TCP and UDP sessions 52, 53. Some of the logical channels within the multiplex connection 51 will be statically allocated; in particular the control channel 52. Other logical channels can be dynamically created as the need arises. Some of the logical channels 53 will be relayed to/from the terminal 10 by the proxy interface agent 11. With each such logical channel the proxy interface agent 11 (or the external server depending on implementation) associates the IP addresses and ports of the specific TCP or UDP connection 10 used between the proxy interface agent 11 and the terminal 10. In other words, the proxy interface agent makes an association between a transport address of the terminal and the transport address on its own end of a logical channel.

As part of the initial configuration, the external server 40 may instruct the proxy interface agent 11 to create sockets to listen for registration information and outgoing call attempts from the terminal 10.

If the terminal 10 subsequently attempts to register with a gatekeeper/server, such messages (H.225 RAS, SIP REGISTER etc.) may be sent to the proxy interface agent 11. The proxy interface agent 11 will forward the registration messages to the external server 40 via a logical channel 52 or 53. Any responses are sent using the reverse route. The external server 40 will store the terminal's private transport address 14 along with the identity or transport address of the multiplex connection 51 on which the registration was received. This information is sufficient to forward incoming calls to the terminal when the need arises.

To establish an incoming call the external server 40 needs 35 to establish a call control channel (H.225 call control for H.323 or SIP) to the terminal 10 via the proxy interface agent 11. If an appropriate logical channel 53 does not already exist between the external server 40 and the proxy interface agent 11, such a logical channel is instantiated. As part of this process, the terminal's private transport address (IP address and port) 14 to which the proxy interface agent 11 is to create the TCP or UDP connection 54 is specified. The messages needed to create the logical channel 53 are exchanged between the external server 40 and the proxy interface agent 11 using the control logical channel 52.

Once the logical channel for the call control signalling has been created the external server 40 can send an H.323/SIP create call message (Setup for H.323, INVITE for SIP etc) to the proxy interface agent 11. The proxy interface agent will then relay this message to the terminal 10 using the TCP or UDP connection 54 established when the logical channel 53 was created.

In the case of H.323 it may be necessary to establish an H.245 connection between the external server 40 and the terminal 10. The address within the terminal 10 to which this connection is to connect is contained in the responses sent back to the external server 40 by the terminal 10. If the external server 40 chooses to establish such an H.245 session, then it creates a new logical channel 53 in the same way it created the call-signalling channel. As part of this procedure the proxy interface agent 11 will establish a TCP connection to the private IP address and port specified in the terminal's responses.

For an outgoing call, a signalling path can be created between the terminal 10 and the external server 40 when the terminal 10 connects and sends a create call message (Setup for H.323, INVITE for SIP etc) to the proxy interface agent 11. If a logical channel 53 for this type of connection does not already exist within the multiplex connection 51, then such a logical channel is created by the proxy interface agent 11 using the control channel 52. The proxy interface agent 11 can then relay the message(s) to the external server 40.

If a separate H.245 connection is required for the outgoing call, the external server 40 will create a new logical channel 53 within the multiplex connection 51 and instruct the proxy interface agent 11 to create a listening socket. The values of address and port of the created socket are returned to the external server 40, which it includes in the H.323 signalling sent in response to the Setup message. This information allows the terminal 10 to connect to the listening socket created by the proxy interface agent 11.

Once the necessary incoming or outgoing call control paths have been established it may be necessary to establish outbound and inbound media paths. As described earlier, the media paths of all currently defined IP based multimedia applications (including H.323, SIP and MGCP) use RTP. RTP is based on UDP, and a unidirectional RTP connection requires both forward and reverse UDP paths to be established. It is, therefore, necessary to establish UDP paths from the terminal 10 to the external server 40 via the proxy interface agent 11, and from the external server 40 to the terminal 10, again via the proxy interface agent 11. Additionally, the RTP and RTCP connections require a fixed relationship between the ports they use. Therefore, in addition to being able to open a single port at a time, it is necessary to be able to open UDP port pairs which have the necessary RTP/RTCP port number relationship. Therefore, while the text below describes opening a single connection, the same principles can be employed to simultaneously request and open port pairs.

The following discussion assumes that the H.323 protocol is being used. The sequences of protocol messages versus control messages may vary for other protocols (such as SIP and MGCP), but the principles remain the same.

To establish a UDP path between the terminal 10 and the external server 40, the external server 40 instructs the proxy interface agent 11 to open a UDP port (or port pair) that the terminal 10 can connect to. The external server 40 also specifies a token that the proxy interface agent 11 should associate with the connection.

On successfully opening the port, the proxy interface agent 11 indicates to the external server 40 the identity of the port. The external server is then able to issue the necessary signalling commands to open a media channel (e.g. H.245 Open Logical Channel in the case of H.323) containing the private IP address and port on the proxy interface agent 11 to which the terminal 10 should send its UDP data. On reception of this command, the proxy interface agent relays the command to the terminal using the connection established previously for this purpose.

The terminal 10 can now start sending RTP and RTCP UDP packets 56 to the proxy interface agent 11. However, prior to forwarding these packets to the external server 40, the proxy interface agent 11 must send probe packets 55 which contain the token specified by the external server 40 when the connection was initially configured. In addition to creating a private-to-public address mapping in the NAPT, the presence of the token allows the external server 40 to associate UDP packets 57 received from the source of these probe packets 55 with the correct logical media channel. Note that it is preferable to defer sending the probe packets 55 for as long as possible as if they are sent too early the address mappings created in the NAT may time out before any media data 56 is sent. Also, it is necessary to be aware that, being UDP, the probe packets 55 may be lost. It is therefore necessary to have the ability to send more than one probe packet 55 for a given connection. Once a probe packet 55 has been sent, the proxy interface agent can relay received UDP data 56 to the external server 40 (as item 57). Alternatively, the token information can be multiplexed into each UDP packet that is sent. Additionally, multiple logical channels may be multiplexed onto one or more UDP connections.

The method of operation is similar for an inbound UDP connection. The external server 40 instructs the proxy interface agent 11 to open a port (or port pair) that can be used to send UDP data to the terminal 10. The proxy interface agent 11 informs the external server 40 of the identity of this port. The external server 40 can then include this information in the protocol specific signalling command to open a media channel (e.g. H.245 Open Logical Channel in the case of H.323) that is sent to the terminal 10 via the proxy interface agent 11. The terminal 10 will reply to this command, giving the private IP address and port at which it wishes to receive UDP data for the connection. This message is relayed back to the external server 40. The external server 40 can then inform the proxy interface agent 11 of the address to which it should relay UDP data for this connection. Further, to create the public-to-private address mapping in the NAT, the external server 40 requests that the proxy interface agent 11 send probe packets 55 for this connection to the external server 40 containing a token. This creates a private-to-public address mapping that in turn acts as a public-to-private address mapping for data sent in the reverse direction. The external server 40 uses the token in the probe packet 55 to determine which NAT address and port it should send UDP data to for this session 57. The external server 40 may now start sending UDP media 57 to this address. The NAT will relay this to the proxy interface agent 11, which will in turn relay it to the terminal 10 (as item 56), thus completing the connection.

When the UDP connections are no longer required, the external server 40 will instruct the proxy interface agent 11 to close the associated sockets. Any private-to-public address mappings in the NAPT will eventually time out as no data will be passing through them.

In this illustration of the invention, we have assumed that the external server is a single device with a single IP address. In other embodiments of the invention the 'external server' may be several co-operating devices. Additionally, the external server device(s) may each have one or multiple IP addresses. Where multiple IP addresses are used, the normal practise is to allocate them from a single subnet, then the programming of the firewall rules becomes specifying the allowed ports to and from a subnet rather than individual IP addresses.

Note that the private IP address and port numbers of an H.323 terminal may in fact be the same as the public IP address and port numbers to which it is mapped, in which case the mapping is transparent.

The advantages of the approach described above are that:
NAT and firewall functions do not need to be upgraded.
Latency of the signal is kept to a minimum.
Organisations only require a protocol agnostic proxy interface agent(s) that can be used with any appropriate real-time protocol.
The IP address(es) of the enterprise does not become public knowledge through process of making calls with that enterprise
Quality of service and other usage based policies (bandwidth utilisation for example) may be implemented piecemeal and don't need a single consistent end-to-end solution. For example, the external server may instruct the proxy interface agent to process one media stream within a call with a certain QOS level, using a method that is appropriate to the connection between the proxy interface agent and the external server, the external server may then map that to corresponding QOS levels available to it in the core network. Likewise, a method of encryption may be used between the proxy interface agent and the external server independently of security mechanisms used for the other parts (legs) of the call.

In summary, the invention provides a method and a system for allowing H.323 (or other real-time protocol conformant endpoints) terminals located in private IP networks that: does not compromise the existing security procedures and measures; that avoids the need to upgrade existing firewalls, routers and proxies; and that allows full NAT to be applied to IP connections without the NAT function interpreting or understanding the communications protocol being used. The invention also permits standard H.323 equipment in one private network to communicate with other H.323 terminals in the same or different private and/or public IP networks via an protocol independent proxy interface agent and via an H.323 proxy server using a shared or public IP network.

Organisations can therefore subscribe to a shared resource in a shared IP network. Costs are kept to a minimum and security is not compromised.

It is to be recognized that various alterations, modifications, and/or additions may be introduced into the constructions and arrangements of parts described above without departing from the spirit or scope of the present invention, as defined by the appended claims.

The invention claimed is:

1. A method of performing a multimedia communication session over a communication link using Transmission Control Protocol (TCP) and over a communication link using User Datagram Protocol (UDP), comprising:
   receiving a request at a server, over the TCP link, to register from a client terminal located within a private network;
   forwarding, at the server, a probe data packet to the client terminal, over the TCP link, requesting to send a data packet over the UDP link, the probe data packet including a unique token that allows the server to associate the data packet received from the client terminal to the UDP link, and the unique token is a unique number, not an IP address and not a port number;
   receiving, at the server, the data packet from the client terminal that contains the unique token, information relating to an address of the client terminal, information relating to an address of the server, and a dynamic port over which the multimedia communication session is to be established;
   utilizing, at the server, the unique token to associate the data packet received from the client terminal with the UDP link;
   comparing the unique number in the data packet received from the client terminal with the unique number included in the probe data packet forwarded by the server; and
   establishing the multimedia communication session over the UDP link only when the unique number received from the client terminal is equal to the unique number included in probe data packet forwarded by the server.

2. The method of claim 1, comprising:
   receiving additional data packets in a predetermined interval over the UDP link from the client terminal to keep alive the multimedia communication session over the UDP link.

3. The method of claim 1, comprising:
   receiving a plurality of data packets from a remote terminal, where destination addresses of the plurality of data packets are the client terminal; and
   forwarding the plurality of data packets to the client terminal with the address and the dynamic port information of the client terminal.

4. The method of claim 1, comprising:
   establishing the communication session over the UDP link based on a RTP/RTCP connection.

5. The method of claim 1, comprising:
   receiving the request and the data packet from the client terminal over a Network Address Translator.

6. A method of performing a multimedia communication session over communication links using at least one of Transmission Control Protocol (TCP) and User Datagram Protocol (UDP), comprising:
   receiving a request at a server, over a first communication link, to register from a client terminal located within a private network;
   forwarding, at the server, a probe data packet to the client terminal, over the first communication link, requesting to send a data packet over a second communication link, the probe data packet including a unique token that allows the server to associate the data packet received from the client terminal to the second communication link, and the unique token is a unique number, not an IP address and not a port number;
   receiving, at the server, the data packet over the second communication link from the client terminal that contains the unique token, information relating to an address of the client terminal, information relating to an address of the server, and a dynamic port over which a multimedia communication session is to be established;
   utilizing, at the server, the unique token to associate the data packet received from the client terminal with the second communication link;
   comparing the unique number in the data packet received from the client terminal with the unique number included in the probe data packet forwarded by the server; and
   establishing the multimedia communication session over the second communication link only when the unique number received from the client terminal is equal to the unique number included in probe data packet forwarded by the server.

7. The method of 6, comprising:
   forwarding an additional probe data packet to the client terminal, over an existing communication link, requesting to send another data packet over at least one subsequent communication link; and
   receiving the another data packet over the at least one subsequent communication link from the client terminal that contains information relating to the address of the client terminal and a dynamic port over which an additional multimedia communication session is to be established.

8. The method of claim 7, further comprising: establishing the at least one subsequent communication link using UDP.

9. The method of claim 8, comprising:
   establishing an additional communication session based on a RTP/RTCP connection.

10. The method of claim 6, further comprising:
    establishing the second communication link using UDP.

11. The method of claim 10, comprising:
    establishing the communication session based on a RTP/RTCP connection.

12. The method of claim 6, further comprising:
    establishing the first communication link before the second communication link.

13. The method of claim 6, further comprising:
    establishing the first communication link using TCP.

14. The method of claim 6, further comprising:
    establishing the first communication link using UDP.

15. The method of claim 6, comprising:
    receiving additional data packets in a predetermined interval over the second communication link from the client terminal to keep alive the multimedia communication session over the second communication link.

16. The method of claim 6, comprising:
    receiving a plurality of data packets from a remote terminal, where destination addresses of the plurality of data packets are the client terminal; and
    forwarding the plurality of data packets to the client terminal with the address and the dynamic port information of the client terminal.

17. The method of claim 6, comprising:
    receiving the request and the data packet from the client terminal over a Network Address Translator.

* * * * *